United States Patent [19]

Bechtolsheim

[11] Patent Number: 4,688,190

[45] Date of Patent: Aug. 18, 1987

[54] HIGH SPEED FRAME BUFFER REFRESH APPARATUS AND METHOD

[75] Inventor: Andreas Bechtolsheim, Stanford, Calif.

[73] Assignee: Sun Microsystems, Inc., Menlo Park, Calif.

[21] Appl. No.: 547,398

[22] Filed: Oct. 31, 1983

[51] Int. Cl.[4] .............................................. G06F 3/153

[52] U.S. Cl. .................................... 364/900; 340/750; 340/799

[58] Field of Search ............... 340/750, 798, 799, 747; 364/200 MS File, 900 MS File, 521, 702; 358/141

[56] References Cited

U.S. PATENT DOCUMENTS

| | | | |
|---|---|---|---|
| 4,135,213 | 1/1979 | Wintfeld | 358/142 |
| 4,148,070 | 4/1979 | Taylor | 358/141 |
| 4,199,757 | 4/1980 | Ichimi | 340/750 |
| 4,370,645 | 1/1983 | Cason et al. | 340/711 |
| 4,485,378 | 11/1984 | Matsui et al. | 340/750 |
| 4,491,836 | 1/1985 | Collmeyer | 340/747 |
| 4,546,451 | 10/1985 | Bruce | 340/900 |
| 4,586,037 | 4/1986 | Rosener et al. | 364/702 |

OTHER PUBLICATIONS

"Trends in Graphic Display Design", William M. Newman; IEEE Transactions on Computers, vol. C-25, No. 12, Dec. 1976, pp. 1321-1325.

"A Random-Access Video Frame Buffer", James T. Kaziya, Ivan E. Sutherland and Edward C. Cheadle; Proceedings of the Conference on Computer Graphics, Pattern Recognition, and Data Structure, May 14-16, 1975.

*Primary Examiner*—Archie E. Williams, Jr.
*Assistant Examiner*—Emily Yue Chan
*Attorney, Agent, or Firm*—Blakely Sokoloff Taylor & Zafman

[57] ABSTRACT

A computer memory architecture is most advantageously used in conjunction with a digital computer, to provide an improved high speed graphics display capability. Data representative of digital images to be displayed is generated and/or manipulated by a display processor and stored within a selected portion of the display processor's main memory. Subsequent modifications to the stored image are effectuated by the display processor reading the data from its main memory, performing appropriate operations on the data, and writing the data back into the main memory. Updated images are transferred to an buffer memory which sequentially stores the images in the order in which they were updated by the display processor. Data representative of an updated image is then transferred to the display frame buffer of the particular display system for subsequent display. Data is transferred from the buffer memory to the frame buffer during periods when the frame buffer is not refreshing the display.

8 Claims, 4 Drawing Figures

HIGH SPEED FRAME BUFFER REFRESH APPARATUS AND METHOD

BACKGROUND OF THE INVENTION

1. Field

The present invention relates to the field of computer memories, and more particularly, to improved apparatus and methods for storing and transmitting data representative of images to a display system.

2. Art Background

In many computer systems, it is quite common to represent and convey information to a user through digital images. These images may take a variety of forms, such as for example, alphanumeric characters, cartesian graphs, and other pictorial representations. In many applications, the digital images are conveyed to a user on a display device, such as a raster scan video monitor, printer or the like. Typically, the images to be displayed are stored in digital form, manipulated, and then displayed.

In many computer display systems, data in the form of binary quantities representative of picture elements comprising an image on a display are stored in a memory referred to as a "frame buffer", such that each data bit (a 1 or 0) is mapped onto a corresponding picture element ("pixel") on the display. Memories used to store representations of each pixel comprising an image are known as "bit-map memories". Thus, there is a one-to-one correspondence between data contained in the memory and the image displayed. A number of bit-maps may be defined within the memory such that color may be associated with each bit-map, thereby permitting multi-colored images to be displayed on an appropriate color monitor or the like. The generation and manipulation of a digital image requires that a large number of bits in the bit-map be updated after a modification.

A number of display systems utilize "dual-ported" memory devices as frame buffers which permit a display processor to read data comprising an image being displayed in order to permit the data currently stored within the dual-ported memory to be updated. The display processor is often required to first read the data from the dual-ported memory device, and then internally modify the data to form an appropriate binary representation of the new image to be displayed. This updated data must then be written back into the dual-ported memory such that it may be accessed through another memory port by the particular display device for subsequent display.

It has been found that the use of a dual-ported memory display system significantly reduces system performance, inasmuch as data may not be updated by the display processor while the display device is reading the contents of the bit-mapped memory for display (the process of reading the contents is typically called a "refresh" cycle). In addition, the display processor must often read data stored within the dual-ported memory frame buffer, modify the data, and then write the data back into the memory. The requirement of a read and write cycle by the display processor in conjunction with the necessity for the execution of a refresh cycle by the display device, results in lower overall speed when updating and generating images for display.

One factor limiting the speed at which an image represented in a bit-map is manipulated is the cycle time of the memory devices comprising the memory. Typically, each memory device represents blocks of adjacent pixels, or other display elements, defining the display. Thus, a digital image such as for example, a line ("vector") will likely be represented by a plurality of pixels the states of which are stored in memory devices representing one portion of the entire bit-map. Accordingly, in application requiring high speed graphic image manipulation, such as animation, the speed at which the computer system is capable of updating and displaying digital images is dependent upon the cycle time of the memory devices. Memory devices, such as dynamic random access memories (D-RAMS), have cycle times of approximately several hundred nanoseconds. Thus, in systems where the computer or display processor is capable of higher speed data manipulations than the display memory devices, the overall system performance is constrained by the limiting cycle times of the memory devices comprising the frame buffer.

As will be described, the present invention provides apparatus and methods for efficiently modifying data comprising an image, and transferring the data to a frame buffer for display on a display system. The present invention thereby permits the modification and updating of images by a display processor at high speed, and avoids the delays associated with dual-ported memory display systems known in the prior art.

SUMMARY OF THE INVENTION

The present invention provides a computer memory architecture which is most advantageously used in conjunction with a digital computer, to provide an improved high speed graphics display capability. Data representative of digital images to be displayed is generated and/or manipulated by a display processor and stored within a selected portion of the display processor's main memory. Subsequent modifications to the stored image are effectuated by the display processor reading the data from its main memory, performing appropriate operations on the data, and writing the data back into the main memory. Updated data is transferred to a buffer memory which sequentially stores the images in the order in which they were updated by the display processor. The data stored in the buffer memory is then transferred to the display frame buffer of the particular display system for subsequent display. Data is transferred from the buffer memory to the frame buffer during periods when the frame buffer is not refreshing the display. Accordingly, the display processor may update and manipulate images to be displayed substantially independently of the timing limitations imposed by display system refresh cycles.

BRIEF DESCRIPTION OF THE DRAWINGS

FIG. 1(*b*) is a timing diagram which illustrates the frame update and video refresh cycle sequence for displaying data on a video display system.

DETAILED DESCRIPTION OF THE INVENTION

An improved computer memory architecture is disclosed having particular application for use by a digital computer to provide high speed graphics capability In the following description, for purposes of explanation, numerous details are set forth such as specific memory sizes, data paths, etc. in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1A:
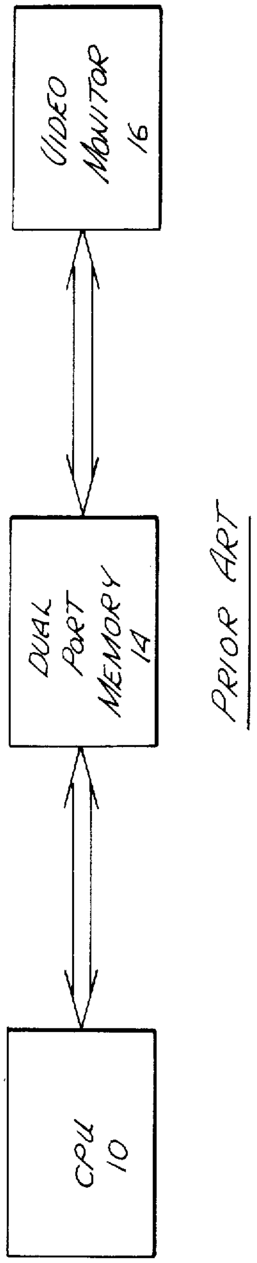
FIG. 1(*a*) is a functional block diagram of a typical prior art display system.
Figure 1B:
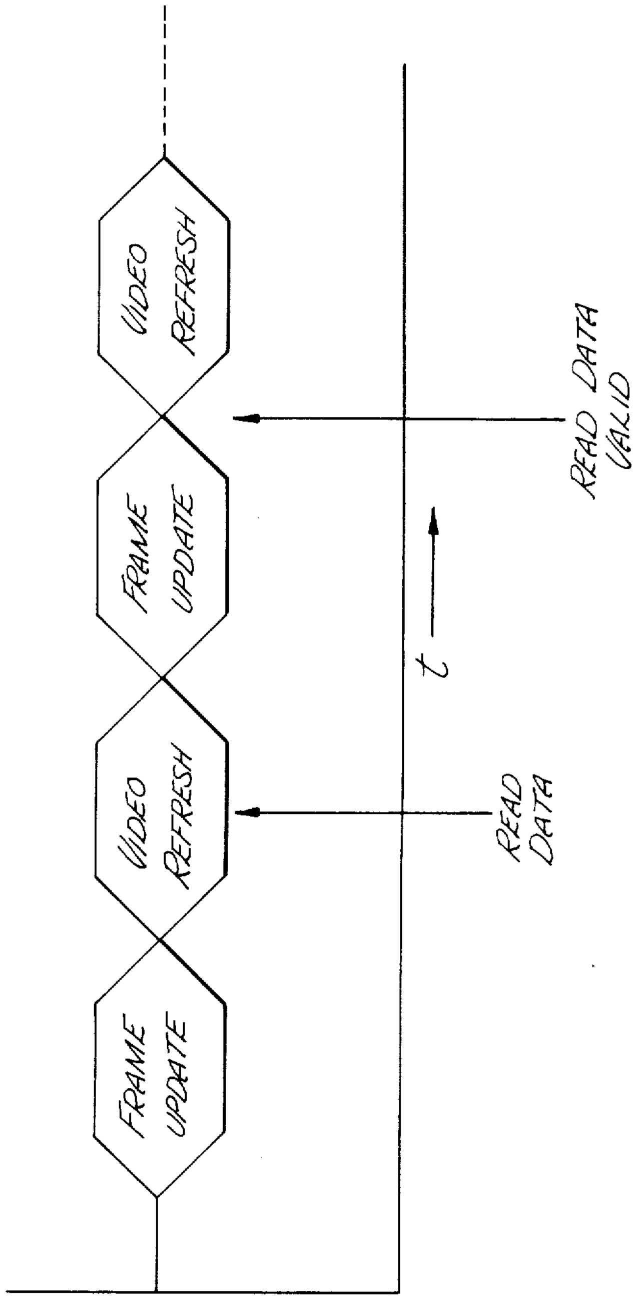

Referring briefly to FIG. 1, a typical dual-ported video display system is illustrated in functional block diagram form. The system includes a central processing unit (CPU) 10, which may comprise a dedicated display processor or a general purpose digital computer, coupled to a dual-ported frame buffer memory 14 for storing a plurality of binary quantities in the form of data representative of images to be displayed on a video monitor 16. As shown, video monitor 16 is coupled to a second port of memory 14 such that both the CPU 10 and video monitor 16 have access to data stored within dual-ported frame buffer memory 14.

As illustrated in FIG. 1(*b*), dual-ported frame buffer memory 14 alternates frame update and video refresh cycles. During a frame update cycle, CPU 10 may read, write or otherwise modify data stored within memory 14 for subsequent display on video monitor 16. During a video refresh cycle, data stored within dual-ported memory 14 is read in order to refresh an image displayed on the video monitor 16. A modification of data stored within dual-ported memory 14 requires that CPU 10 initiate a read cycle to read data stored within memory 14 comprising the contents of the current display, modify the data, and then write the data back into the dual-ported memory 14. The requirement of read, modification and write cycles in order to update a display image competing with the video refresh cycles for access to the frame buffers, causes a substantial performance reduction in the system. In practice, it has been found that a major factor in loss of system performance is the requirement that CPU 10 wait for data to be provided from memory 14 in executing read operations in order to update the frame buffer.

Figure 2:
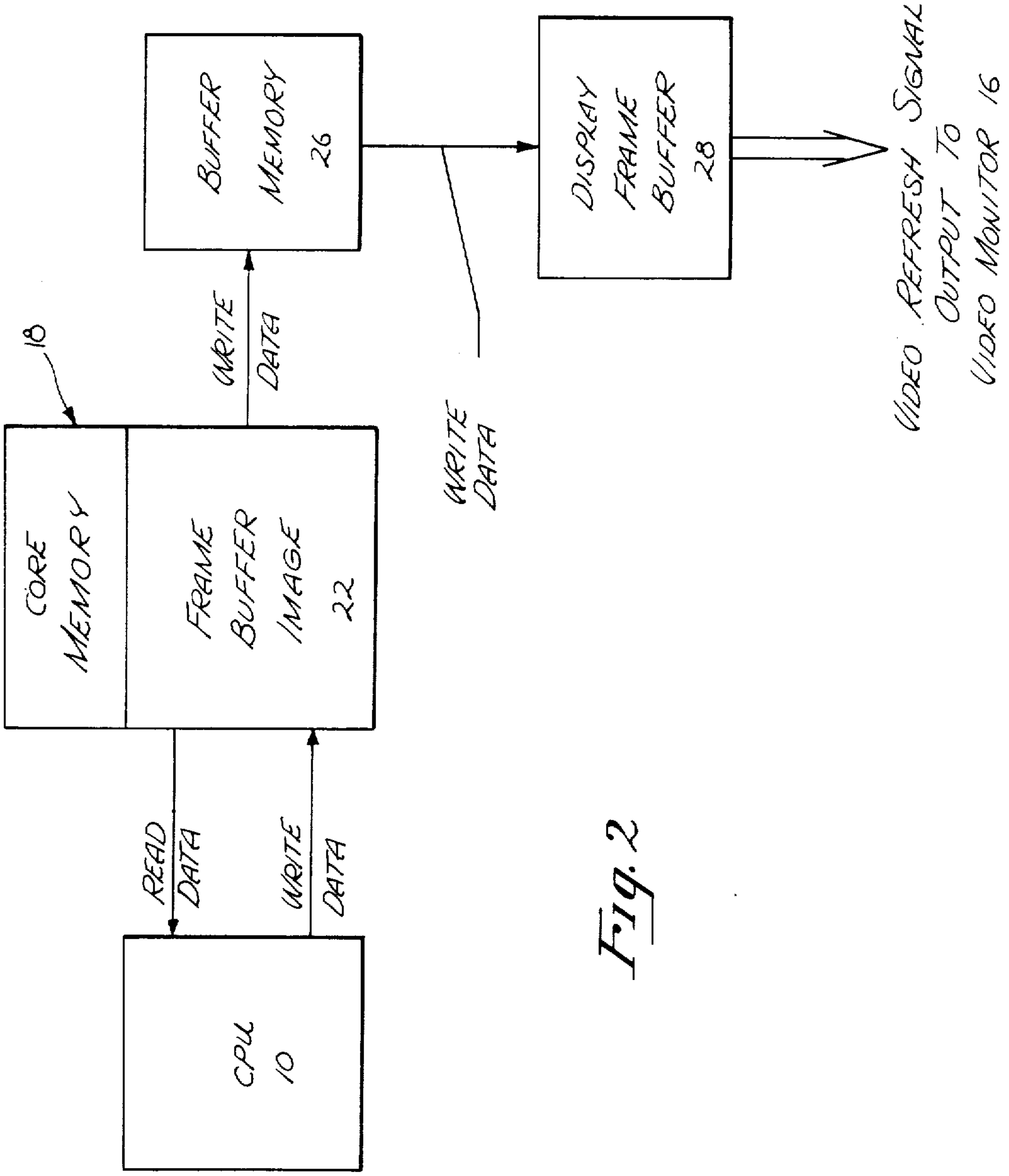
FIG. 2 is a functional block diagram of one embodiment of the present invention.

Referring now to FIG. 2, one embodiment of the present invention is illustrated which overcomes the disadvantages found in prior art computer display systems such as that illustrated in FIG. 1(*a*). In the present embodiment, CPU 10 is coupled directly to main memory 18 as is common in most computer systems. As shown, a portion of main memory 18 includes a copy of the display data (frame buffer image 22) which comprises a bit-map representation of display elements on video monitor 16 or other display device. Display data stored comprising the frame buffer image 22 may be updated and manipulated at high speed by CPU 10 using standard read and write cycles typical in computer systems. As will be appreciated from the discussion which follows, the rate at which frame buffer image 22 may be updated is a function of the operational speed of the computer system, and is substantially independent of the refresh rate of the display system. Display data, as updated, is transferred through a series of sequential write operations to buffer memory 26 for temporary storage. In the present embodiment, buffer memory 26 contains a sufficient amount of memory in order to retain data comprising a number of sequential frame buffer images to be displayed.

Buffer memory 26 is coupled to a display frame buffer 28 which is used to refresh the video image displayed on video monitor 16. As previously described, display frame buffer 28 alternates frame update and refresh cycles as illustrated in FIGS. 1(*b*) and 3. Accordingly, data stored within buffer memory 26 may be written into the display frame buffer 28 in order to update a displayed image during the frame update cycles, and may not be written into the display frame buffer 28 during video refresh cycles in which data is read from display frame buffer 28 and coupled to the video monitor 16 in appropriate form for display. Although in the present embodiment buffer memory 26 acts as a device for temporary storage of images updated in frame buffer image 22, it will be noted that translations of the data may occur during this period by way of operations performed on the stored data. Such translations may include for example, address mappings, clippings, rotations, as well as data smoothing and enhancement.

Although FIG. 2 depicts a display system incorporating a video monitor 16, it will be appreciated that numerous other display devices may be utilized by the present invention, such as by way of example, laser or ink jet printers and the like.

The rate of transfer of data stored within buffer memory 26 to display frame buffer 28 is a function of the speed of the particular display system, and is substantially independent of the rate which CPU 10 is updating image display data in the frame buffer image 22 within main memory 18. As such, the present invention obviates the need for a dual-ported system which s subject to the necessity of providing data to a display processor through a series of time consuming write operations, as well as the execution of the video refresh and frame update cycles. It will be noted that in the present invention, only write operations are transferred between the frame buffer image 22, buffer memory 26, and display frame buffer 28, since read operations are applied at the frame buffer image 22 in main memory 22 by CPU 10.

Figure 3:
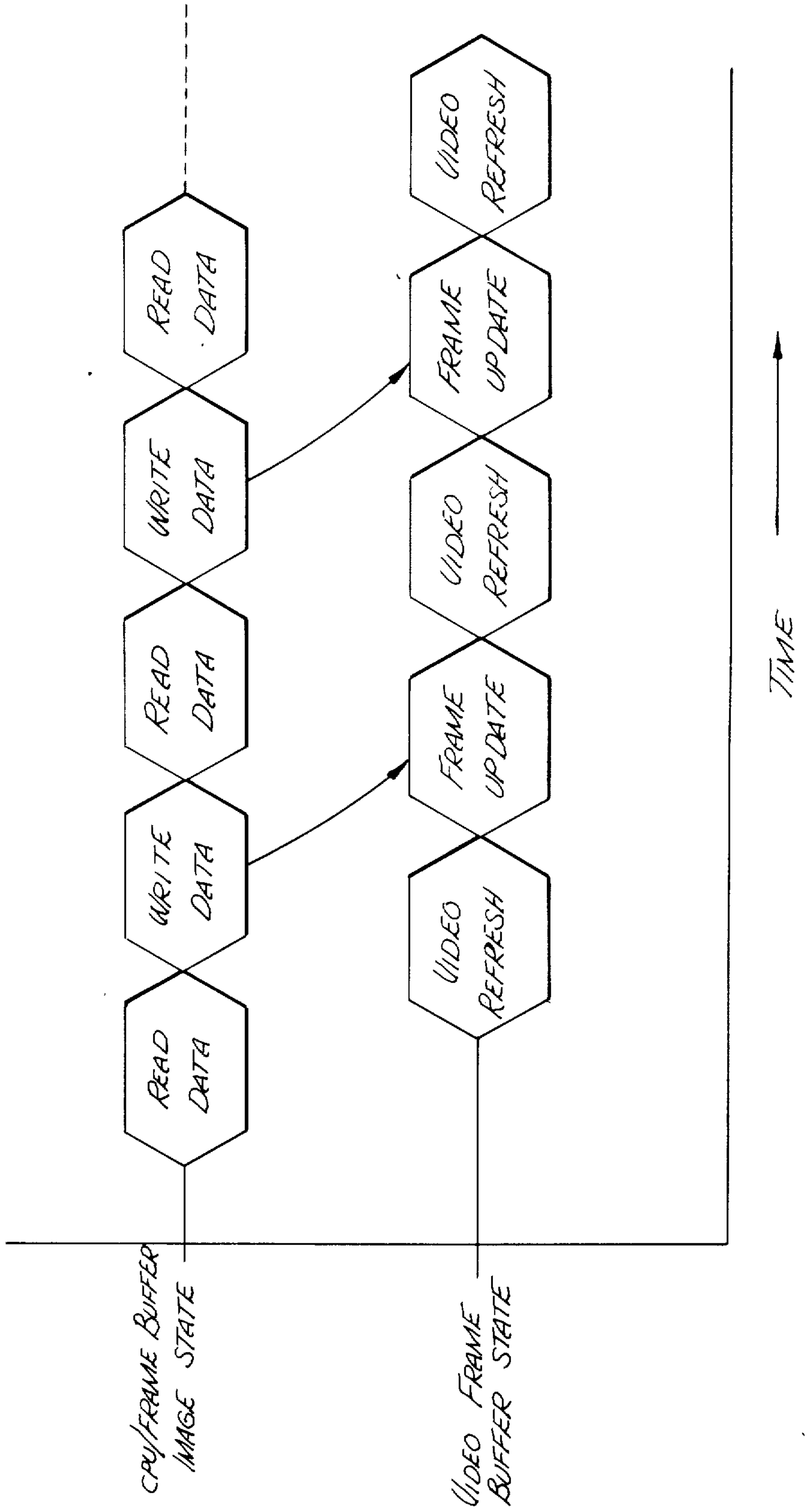
FIG. 3 is a timing diagram which illustrates the sequence of operations of the present invention in order to maximize the rate at which updated images may be displayed.

Referring now to FIG. 3, a timing diagram is provided which illustrates the operation of the present invention. As shown, CPU 10 may continuously and alternately execute read and write data operations to and from main memory 18, in order to update and manipulate data comprising the frame buffer image 22 for subsequent display. Similarly, display frame buffer 22, as previously described, alternately executes video refresh and frame update cycles as is typical. The use of buffer memory 26 permits updated image display data originally stored within frame buffer image 22 and passed for temporary storage into buffer memory 26, to be written into the display frame buffer 28 during frame buffer update cycles.

Accordingly, the present invention, through the use of frame buffer image 22, coupled to buffer memory 26, permits the rate at which CPU 10 updates the frame buffer image 22 to vary significantly from the rate at which updates can be transferred to the display frame buffer 28. In the case where the number of write operations by CPU 10 into the frame buffer image 22 does not exceed the maximum video frame update rate, the display system will generally run at the main memory cycle speed. Alternatively, where very fast memory devices for main memory 18 are utilized, such that the number of write operations by the CPU exceeds the speed of the display frame buffer update rate, the overall display system speed is only limited in the unlikely event that the buffer memory is full and is unable to accept additional data.

Thus, an improved computer memory organization has been disclosed which permits high speed graphic manipulations on a display system.

I claim:

1. An improved computer display system including a central processing unit (CPU) and display means for displaying images on a display, comprising:

main memory means directly coupled to said CPU for storing a plurality of data points representative of display elements defining a plurality of images to be displayed on said display, said data points being selectively updated directly by said CPU through read operating to determine a current status of said main memory means then selective desired write operations into said main memory means;

frame buffer means directly coupled to said display means for storing data points representative of display elements defining images currently being displayed, and periodically refreshing said display by outputting said selectively updated data points in order to display images defined by said updated data points;

buffer memory means directly coupled to said main memory means and to said frame buffer means for receiving and storing said updated data points from said memory means, and transferring said updated data points to said frame buffer means between periods when said frame buffer means is refreshing said display;

wherein images stored in said main memory means are updated by said CPU independently of said periods when said frame buffer means is refreshing said display.

2. The computer display system as defined by claim 1, wherein said buffer memory means stores data points representative of multiple images for sequential display, said frame buffer means sequentially receiving said data points between said refresh periods.

3. The computer display system defined by claim 2, wherein said display of said display means comprises a raster-scan video display.

4. The computer display system as defined by claim 2 wherein said buffer memory means includes translation means for performing translations on said data points prior to passing said data points to said frame buffer means for display.

5. In a computer display system including a central processing unit (CPU), a main memory, and display means for displaying images on a display, an improved method for updating said images, comprising the steps of:

storing a plurality of data points representative of display elements defining a plurality of images to be displayed on said display in said main memory, said data points being selectively updated by said CPU through read operations to determine a current status of said main memory means then selective desired write operations into said main memory means;

transferring said updated data points from said main memory directly into a buffer memory means being directly coupled to said main memory for temporary storage;

transferring said updated data points from said buffer means to frame buffer memory means being directly coupled to said display means to permit said display means to display images defined by said updated data points, said updated data points being transferred to said frame buffer means between periods when said frame buffer means is refreshing said display;

wherein images stored in said main memory are updated by said CPU by said read and write operations independently of said periods when said frame buffer means is refreshing said display.

6. The method as defined by claim 5 when said buffer memory means stores data points representative of multiple updated images for sequential display, said frame buffer means sequentially receiving said data points between said refresh periods.

7. The method as defined by claim 6, wherein said display comprises a raster-scan video display of said display means.

8. The method as defined by claim 6, further including the step of translating said updated data points by performing operations on said data points prior to passing said data points to said frame buffer means for subsequent display.

* * * * *